États-Unis Patent Office 3,334,076
Patented Aug. 1, 1967

3,334,076
INHIBITING GELATION OF HYDROFORMYLATED POLYMERS
Joseph Kern Mertzweiller and Horace Marion Tenney, Baton Rouge, La., assignors to Esso Research and Engineering Company, a corporation of Delaware
No Drawing. Filed June 19, 1963, Ser. No. 288,873
18 Claims. (Cl. 260—85.1)

This invention relates to inhibiting the gelation of hydroformylated polymers. More particularly it relates to a method of inhibiting the gelation of highly hydroxylated and/or carbonylated polymers formed from the reaction of an olefinic polymer with carbon monoxide and hydrogen in the presence of a hydrocarbon soluble oxo-type catalyst.

It has been found that novel oxygenated hydrocarbon polymers, i.e., hydroxylated and/or carbonyl derivatives, can be prepared by reacting an olefinic polymer of a type hereinafter described with carbon monoxide and hydrogen in the presence of a hydrocarbon soluble complex which contains a transition metal selected from Group VIII of the Periodic Chart in complex bond with at least one ligand consisting of a carbon monoxide molecule, and at least one biphyllic ligand which contains an atom selected from Group V–A of the Periodic Chart of the Elements.

The novel polymers pertinent to the present invention are hydroformylation products of unsaturated hydrocarbon polymers having molecular weights of from about 300 to about 1,000,000 and wherein about 5 to 100% of said unsaturation has been replaced with —$CH_2OH$ and/or —CHO groups. Thus, the present invention relates to a polymer which is the reaction product of an unsaturated hydrocarbon polymer having a molecular weight of from 300 to about 1,000,000 and having Type I, II, III or IV, or mixtures of such types of unsaturation with carbon monoxide and hydrogen wherein from about 5 to 100% of said unsaturation is replaced with $CH_2OH$ and/or —CHO groups. Especially preferred are the reaction products of diolefin polymers having a molecular weight range of about 500 to 100,000 and copolymers of diolefins with monoolefins having a similar molecular weight range.

Highly useful polymers are obtained by hydroxylation and/or hydrocarbonylation of polybutadiene or butadiene-styrene copolymers which contain at least 10%, and preferably 50 to 80%, of the unsaturation present as pendant vinyl groups, resulting from 1,2 addition of butadiene during polymerization. These preferred products have a molecular weight range of 500–500,000 and have 5 to 100% of the unsaturated linkages replaced by $CH_2OH$ and/or —CHO groups. These compositions of matter are further characterized in that all the hydroxyl groups are primary. Further, the oxygen content of these polymers, the predominent portion of which is present as primary alcohol groups or aldehyde groups, is generally in the range of 0.5 to 15% by weight.

An advantage residing in the hydroxylated and carbonylated polymers obtained by hydroformylation of polymers and copolymers as hereinlater described is that the functionality of said polymers can be controlled to a considerable degree by the choice of the type of catalyst and the reaction conditions employed. Thus, it is possible to introduce predominantly carbonyl or predominantly hydroxyl functionality into the polymers. This ability to introduce reactive functional groups into unsaturated polymers having the broad molecular weight range, hereinbefore set forth, offers broad areas for the application of the resulting hydroformylation products. For example, the hydroformylated products of this invention may be employed as plasticizers for resins, such as vinyl-type resins, coating materials, adhesives and as hydroxyl-containing component in the preparation of polyurethane and other types of foams.

It is found, however, that as the amount of functionality is increased, particularly with regard to the carbonylated polymers, a point is reached at which the product will undergo gelation at ambient temperatures. Generally this point is at about the 3 to 4% oxygen level or above. This type of gelation is generally reversible with temperature and is believed to be attributable to hemi-acetal formation between the carbonyl groups of the polymers and a limited number of hydroxyl groups which are introduced concurrently. Such gelation is obviously very undesirable and may constitute a process barrier to the introduction of large amounts, that is greater than 5%, of oxygen.

It is an object of the present invention, therefore, to provide a method for inhibiting gelation in the hydroformylated polymers to which the present invention is directed.

In accordance with the present invention it has been discovered that gelation can effectively be eliminated by introduction of a suitable lower molecular weight alcohol into the polymer system. The alcohol must be present in amounts of considerable molecular excess over the functional groups, i.e., carbonyl groups, in the polymer. In this way, the carbonyl groups on the polymer will hemi-acetalize with the relatively low molecular weight alcohol, rather than with the hydroxyl groups on the polymer. Thus, only a small enhancement in molecular weight results rather than a less desirable large enhancement resulting from the crosslinking of the polymer molecules. The objective is then accomplished in that the polymer system remains fluid inasmuch as gelation has been effectively inhibited. The advantages concomitant with the accomplished objective are among others: ease in shipment of the polymer product, storage in an easier-to-handle form, facility in application as a coating, as well as improved properties of the resulting cured coatings. The hemi-acetalized functionality between the polymer aldehyde groups and the low molecular weight alcohol is easily reversed by thermal means, e.g., at temperatures in excess of about 200° F.

In accordance with the present invention suitable lower molecular weight alcohols are the primary alcohols containing the monovalent carbinol groups —$CH_2OH$ having from 1 to 12 carbon atoms per molecule. Representative of such primary alcohols are methanol, ethanol, propanol, butanol, pentanol, hexanol, heptanol, octanol, nonanol, decanol, dodecanol, and the like. The $C_1$ to $C_5$ primary alcohols, i.e., methanol, ethanol, propanol, butanol and pentanol, are particularly preferred for use in the present invention. Branched primary alcohols, e.g., isobutanol, 2-methyl, 1-butanol, etc., can also be used.

As stated above, the alcohol must be present in considerable molar excess over the functional groups of the polymer being treated. Generally a molar ratio of 1.5:1 to 20:1 mole of alcohol per mole of functional group in the polymer, and preferably a ratio of from 2:1 to 10:1. The manner of addition of the alcohol is not critical to the present invention. Therefore the alcohol may be initially added to the reaction mixture and thus be present during the hydroformylation reaction or the alcohol may be added after the reaction is completed, for example, added to the reactor effluent while said effluent is still warm. It may also be added when the reaction is partially completed.

The polymers to which the present invention are directed are suitably prepared by the hydroformylation of any hydrocarbon polymer having at least one ethylenic carbon to carbon bond in said polymer. Thus, polymers having Type I (pendant vinyl) unsaturation, Type II (internal cis or trans) unsaturation, Type III (tertiary) unsaturation, Type IV (tri substituted) unsaturation or polymers having more than one of such types may be employed. Certain ytpes of unsaturation are found to be preferred over the others, however, and therefore Type I (pendant vinyl) and Type III (tertiary) unsaturation are most preferably present in the hydrocarbon polymer with Type II (internal cis or trans) and Type IV (tri substituted) unsaturation following in that order. The hydrocarbon polymers suitable for use are further characterized by their molecular weight, viz about 300 to about 1,000,000 and more. The polymers amenable to the hydroformylation reaction may be oily, elastomeric, plastic, and the like type polymers prepared by any suitable polymerization process. Thus, included are the Buton resins, elastomeric polybutadienes, styrene-butadiene rubber, natural rubber, and ethylene-propylene-diolefin tripolymers. The basic requirement is that the polymers contain one or more of the types of unsaturation set forth above and in sufficient quantity that they undergo reaction with the type of catalysts described herein.

It has been found that diolefin polymers or copolymers of a diolefin with a monoolefin are especially amenable to the hydroformylation reaction. Therefore, polybutadiene, polypentadiene, polycyclopentadiene, polyisoprene, and mixtures, or copolymers of one or more of these diolefins and the like are examples of preferred polymers.

Examples of the preferred copolymers of diolefins with monoolefins contemplated by the present invention are butadiene - styrene copolymers, pentadiene - styrene copolymers, isoprene-styrene copolymers, and also copolymers of the diolefins with aliphatic monoolefins, methyl styrene, and the like.

Especially amenable as starting polymers in the present invention are commercial polybutadienes or copolymers of butadiene and styrene of molecular weights in the range of about 300 to about 4,000, for example, Buton 100 of molecular weight 2500 to 4000 and Buton 150 of molecular weight 1500 to 2000.

The hydrocarbon polymers employed may generally be prepared by any method known to the art, for example, by the use of a sodium or lithium alkyl, free radical catalyst or acidic catalyst.

The polymers are generally employed in an inert hydrocarbon medium which may be either paraffinic or aromatic-type solvents, the latter being preferred. The polymer may also be employed without a diluent.

The hydrocarbon soluble complexes used as catalysts in the preparation of the hydroformylated polymers of the present invention are oxo-type catalysts and can be represented by the following formulae:

(I)  [M$_2$(CO)$_6$(BR$_3$)$_2$]

and (II) [(R')M(CO)$_y$(BR$_3$)]$_x$ where in both Formula I and Formula II, M is a transition metal selected from the group consisting of iron, cobalt and rhodium, and preferably is cobalt; B is a Group VA atom selected from the group consisting of phosphorus and arsenic, and preferably is phosphorous; R is a radical containing from 1 to about 20, and preferably 1 to 6 carbon atoms and is chosen from the group consisting of alkyl and alkoxy; and in Formula II, R' represents a pi bonded conjugated diolefin or allylic structure containing 3 to 6 carbon atoms; $x$ is 1 or 2 and $y$ is 1 or 2 with the proviso that when $x$ is 1 then $y$ is 2, and when $x$ is 2 then $y$ is 1.

The preferred forms of the complexes employed in the process of the present invention may be represented by the following formulae:

(III)  [Co$_2$(CO)$_6$(PR$_3$)$_2$]

and (IV)  [(C$_n$H$_{2n-1}$)Co(CO)$_y$(PR$_3$)]$_x$ where in both Formula III and Formula IV, R is a radical containing from 1 to 6 carbon atoms and is chosen from the group consisting of alkyl and alkoxy, and in Formula IV, $n$ is an integer from 3 to 6, and $x$ and $y$ are as defined above.

Preparation of the complexes employed in the process of the present invention is described more fully in copending applications, Ser. No. 256,258 and Ser. No. 256,260 of Mertzweiller and Tenney, both filed Feb. 5, 1963.

It should be understood, however, that the scope of the instant invention should be in no way restricted in view of the above disclosures.

In order to facilitate a clear understanding of the invention, the method of this invention is illustrated by the following preferred embodiments described in detail.

*Example 1*

A 40% solution of polybutadiene (130 gms.) (ca. 2000 mol. wt.) in xylene was mixed with 1.3 gms. of the tributyl phosphine derivative of 2 butenyl cobalt tricarbonyl in a 300 cc. stirred autoclave. The mixture was treated under 600 p.s.i.g. of synthesis gas (1/1 H$_2$/CO) for a total of 67 minutes at 385° F. Sample withdrawn after 30 minutes and 67 minutes on conditions analyzed 2.7 and 3.5 wt. percent oxygen on polymer, respectively. After treating with nitrogen at 700 to 800 p.s.i.g. and 385° F. to decompose the catalyst the product analyzed 3.6 wt. percent oxygen. The oxygen was present largely as carbonyl (aldehyde) groups but some hydroxyl groups were present as indicated by the infrared spectra. After discharging from the autoclave and standing overnight the product set to a rubbery mass. By heating to a temperature of 120 to 130° F. in a water bath the product became entirely fluid and it was shown that the gelation process was temperature reversible.

The heated fluid product was mixed with sufficient n-butyl alcohol to give a composition of 34% polymer in a solvent mixture of 22.5% butanol and 77.5% xylene. This mixture showed no tendency to gel on standing for several days.

*Example 2*

The 300 cc. stirred autoclave employed in Example 1 was charged with 100 gms. of 40% polybutadiene in xylene, 22 gms. of n-butanol and 1.2 gms. of tri n-butyl phosphine derivative of 2-butenyl cobalt tricarbonyl. The hydroformylation was carried out at 600 p.s.i.g. (1/1 H$_2$/CO) synthesis gas, 385° F. for a total of 90 minutes. Samples corresponding to 30 minutes and 90 minutes reaction time analyzed 4.3% and 8.4 wt. percent oxygen on polymer (after correction for n-butanol). A carbonyl number of 115 was measured on the polymer accounting for an estimated 3.3 wt. percent oxygen on the polymer. The hydroxyl group functionality in the polymer amounted to 5.1 wt. percent oxygen equivalent by difference. This product gelled on standing overnight. An aliquot of 104.5 gms. of the product was mixed with 25.0 gms. of n-butanol and heated in the water bath to reverse the gelation. This liquid product showed no tendency to gel on standing for several days. The final product composition was 26.4% hydroformylated polymer in a solvent consisting of 46% n-butanol and 54% xylene.

*Example 3*

A run was made duplicating Example 2 but using dioxane rather than n-butanol. The final product analyzed 6.9% oxygen on polymer and gelled regardless of how much dioxane was added. This indicates that the hydroxyl group and not merely an oxygenated solvent is required.

*Example 4*

The autoclave employed in the foregoing examples was charged with 132.8 gms. of 40% polybutadiene in xylene and 2.4 gms. of a catalyst solution prepared by treating 20 gms. of the complex salt

[Co(CO)₃(PBu₃)₂][Co(CO)₄]

slurried in 100 gms. n-hexane for 35 minutes at 385° F. and 430 to 490 p.s.i.g. synthesis gas (1/1 H₂/CO). The hydroformylation was carried out at 600 p.s.i.g. (1/1 H₂O/CO) and 385° F. for a total of 217 minutes while maintaining a flow of synthesis gas through the autoclave averaging about 0.7 liter/minute. The oxygen determinations on the polymer were as follows:

| Time, Minutes: | Oxygen content, Wt. percent |
| --- | --- |
| 60 | 2.26 |
| 120 | 3.37 |
| 215 | 6.02 |

The final product had a hydroxyl number of 55 and a carbonyl number of 52 (based on polymer). This product was treated with hydrogen at 385° F. and 1500 to 1600 p.s.i.g. for 90 minutes. The hydroxyl number of the polymer was 92 and the carbonyl number was 21 after the hydrogen treatment. This product gelled on standing overnight.

An aliquot of 22.3 gms. of the product and 5.2 gms. n-butanol was heated on the water bath. This amount of alcohol was barely insufficient to completely inhibit gelation and a small amount of gelation was noted on several days' standing.

An aliquot of 6.1 gms. of product and 1.0 gm. of isopropanol gelled on standing overnight. It can therefore be concluded that secondary alcohols are not particularly effective in inhibiting gelation.

Steel panels were coated with the reaction product (heated above the gelation point) and the product mixed with n-butanol as described above. The coatings were allowed to dry in air at ambient conditions. The coating from the untreated product was opaque and very soft (<3B pencil hardness) film while that from the butanol treated product was entirely clear and much harder (6B).

*Example 5*

The 300 cc. stirred autoclave was charged with 100 gms. of a 40% Buton–100 in toluene solution and 1 gm. of crystalline solid catalyst consisting of the triethyl phosphite derivative of 2-methyl butenyl cobalt tricarbonyl. The Buton–100 is a commercial copolymer in the 3000 molecular weight range consisting of about 80% butadiene and 20% styrene. About ⅔ of the unsaturation in this polymer is present as pendant vinyl groups.

The autoclave was heated to 320 to 330° F. and maintained under 1000 to 1100 p.s.i.g. of 1/1 H₂/CO synthesis gas for a period of 90 minutes. During this period gas absorption averaged about 8 lbs./minute. Thirty (30) gms. of methanol were pressured into the reactor and the reaction continued for 2 hours longer at 320° F. and about 1000 p.s.i.g. of 1/1 synthesis gas. Gas absorption during this period averaged about 5 lbs./minute. The product withdrawn from the autoclave was entirely fluid and stable at room temperature. Evaporation of solvent gave a viscous polymer which contained 10.5% oxygen principally as aldehyde groups and which gelled readily on standing.

*Example 6*

The 300 cc. autoclave was charged with 100 gms. of 40% Buton–100 in toluene and 5 gms. of a catalyst solution containing about 1 gm. of the crystalline phosphorus bridged complex carbonyl

[Co(CO)₃(P(C₄H₉)₃)]₂

The autoclave was heated to 350° F. and maintained under about 1000 p.s.i.g. synthesis gas (1/1 H₂/CO) for 1½ hours. Average gas absorption rate was about 8 lbs./minute. Thirty gms. of methanol was pressured into the autoclave and the reaction continued for 1 hour longer during which the gas absorption rate averaged about 5 lbs./minute. An aliquot of the final product was stripped free of solvents and found to contain 6.2 wt. percent oxygen on the polymer.

*Example 7*

This example was identical to Example 6 except that 10 gms. of catalyst solution equivalent to about 2 gms. of phosphorus bridged complex carbonyl was used rather than 5 gms. Gas absorption during the first 1½ hours averaged about 14 lbs./minute. After adding 30 gms. methanol the absorption rate averaged about 4 lbs./minute during the subsequent hour on conditions. The product was then treated with hydrogen at 1600 to 1700 p.s.i.g. and 385° F. for 2 hours. An aliquot of product stripped free of solvent analyzed 8.91 wt. percent oxygen on polymer or about 47% of the theoretical oxygen capable of being introduced by hydroformylation. The oxygen was present mainly as primary hydroxyl groups.

What is claimed is:

1. A composition of matter comprising the reaction product of (A) —CHO groups of a fluid hydroformylation reaction product of an unsaturated hydrocarbon polymer having a molecular weight of from about 300 to about 1,000,000 wherein about 5 to 100% of said polymer's unsaturation has been replaced with groups consisting of —CH₂OH and —CHO and (B) a molar excess of an alcohol containing a monovalent carbinol group, said reaction product being formed at temperatures below about 200° F.

2. A composition of matter which comprises the reaction product of (A) —CHO group of a fluid hydroformylation reaction product of an unsaturated hydrocarbon compound having a molecular weight of from about 300 to about 1,000,000 with carbon monoxide and hydrogen, wherein from about 5 to 100% of said unsaturation is replaced with groups consisting of —CH₂OH and —CHO and (B) a molar excess of a primary alcohol containing from 1 to about 5 carbon atoms, said reaction product being formed at temperatures below about 200° F.

3. The product of claim 2 in which the unsaturated hydrocarbon polymer is selected from the group consisting of diolefin polymers and copolymers of a diolefin with a monoolefin.

4. The product of claim 2 in which the alcohol is a primary alcohol containing 1 to 5 carbon atoms.

5. The product of claim 2 in which the alcohol is present in a molar ratio of 1:1 to 10:1 moles of alcohol per mole of functional groups in the hydroformylation reaction product.

6. The product of claim 3 in which the polymer is a butadiene-styrene copolymer.

7. The product of claim 3 in which the polymer is a butadiene polymer having a molecular weight of from about 500 to about 4000.

8. A polymeric composition of matter comprising the reaction product of (A) —CHO groups of a fluid hydroformylation reaction product of an unsaturated hydrocarbon polymer containing from 10 to 80% of said unsaturation present as pendant vinyl unsaturation, with carbon monoxide and hydrogen, wherein the molecular weight of said product is from 500 to 500,000, from 5 to 100% of said unsaturation has been replaced with groups consisting of —CH₂OH and —CHO, and wherein the oxygen content introduced into said polymer is from 0.5 to 15% by weight and (B) from 1 to 10 moles of butanol per mole of functional groups in the hydroformylation reaction product, said reaction product being formed at temperatures below about 200° F.

9. A method for inhibiting gelation in polymers which comprises adding a molar excess of an alcohol containing a monovalent carbinol group to a fluid hydroformylation reaction product of an unsaturated hydrocarbon polymer having a molecular weight of from about 300 to about 1,000,000 wherein about 5 to 100% of said polymer's unsaturation has been replaced with groups consisting of —CH$_2$OH and —CHO and forming a stable reaction product, at temperatures below about 200° F., of the alcohol and the —CHO groups of the polymer.

10. The method of claim 9 in which from 1 to 10 moles of a primary alcohol containing 1 to 5 carbon atoms are added per mole of functional groups in the hydroformylation reaction product.

11. In the method of preparing oxygen-containing polymers which comprises reacting a mixture of an unsaturated hydrocarbon compound having a molecular weight of from about 500 to about 1,000,000 with carbon monoxide and hydrogen under hydroformylation reaction conditions in the presence of a hydrocarbon soluble complex selected from the class consisting of the following general formulae:

(I)          [M$_2$(CO)$_6$(BR$_3$)$_2$]

and (II)         [(R′)M(CO)$_y$(BR$_3$)]$_x$ where in Formula I and II, M is a transition metal selected from the group consisting of iron, cobalt and rhodium, B is a group VA atom selected from the group consisting of phosphorus and arsenic, R is a radical containing from 1 to about 20 carbon atoms and is chosen from the group consisting of alkyl and alkoxy, in Formula II, R′ is a pi bonded conjugated diolefin containing from 3 to 6 carbon atoms, $x$ is an integer from 1 to 2, $y$ is an integer from 1 to 2, with the proviso that when $x$ is 1, then $y$ is 2, and when $x$ is 2, then $y$ is 1, to replace about 5 to 100% of said polymer's unsaturation with groups consisting of —CH$_2$OH and —CHO, the improvement which comprises adding a molar excess of a primary alcohol containing 1 to 5 carbon atoms to the reaction mixture, thereby inhibiting gelation of the oxygen-containing polymer and promoting the formation of a stable reaction product between the alcohol and the —CHO groups of said polymer at temperatures below about 200° F.

12. The method of claim 11 in which the alcohol is added in molar ratio of from 1 to 10 moles of alcohol per mole of polymer.

13. The method of preparing gel-inhibited oxygen-containing polymer which comprises reacting a hydrocarbon polymer containing olefinic unsaturation with carbon monoxide and hydrogen under hydroformylation reaction conditions in the presence of a catalytic amount of a hydrocarbon soluble complex having the formula:

$$Co_2(CO)_6(PR_3)_2$$

wherein R is a radical containing from 1 to 6 carbon atoms and is chosen from the group consisting of alkyl and alkoxy to replace about 5 to 100% of said polymer's unsaturation with groups consisting of —CH$_2$OH and —CHO, and from 1 to 10 moles of a primary alcohol containing 1 to 5 carbon atoms per mole of functional groups introduced into the polymer and forming, at temperatures below about 200° F., a stable reaction product of the alcohol and the —CHO groups of said polymer.

14. The method of claim 13 in which the alcohol is n-butanol.

15. The method of claim 13 in which the alcohol is methanol.

16. The method of preparing gel-inhibited oxygen-containing polymers which comprises reacting a hydrocarbon polymer containing olefinic unsaturation with carbon monoxide and hydrogen under hydroformylation reaction conditions in the presence of a catalytic amount of a hydrocarbon soluble complex having the formula:

$$[(C_nH_{2n-1})Co(CO)_y(PR_3)]_x$$

wherein R is a radical containing from 1 to 6 carbon atoms and is chosen from the group consisting of alkyl and alkoxy, $n$ is an integer of from 3 to 6, $x$ is an integer of from 1 to 2, and $y$ is an integer of from 1 to 2, with the proviso that when $x$ is 1, then $y$ is 2, and when $x$ is 2, then $y$ is 1, to replace about 5 to 100% of said polymer's unsaturation with groups consisting of —CH$_2$OH and —CHO and from 1 to 10 moles of a primary alcohol containing 1 to 5 carbon atoms per mole of functional groups introduced into the polymer and forming, at temperatures below about 200° F., a stable reaction product of the alcohol and the —CHO groups of said polymer.

17. The method of claim 16 in which the alcohol is n-butanol.

18. The method of claim 16 in which the alcohol is methanol.

References Cited

UNITED STATES PATENTS

| | | | |
|---|---|---|---|
| 2,820,059 | 1/1958 | Hasek et al. | 260—602 |
| 3,037,963 | 6/1962 | Christenson | 260—80.5 |
| 3,231,621 | 1/1966 | Slaugh | 260—85.1 |

JOSEPH L. SCHOFER, *Primary Examiner.*

W. HOOVER, J. A. SEIDLECK, *Assistant Examiners.*